United States Patent [19]

Simor

[11] Patent Number: 5,165,018

[45] Date of Patent: Nov. 17, 1992

[54] SELF-CONFIGURATION OF NODES IN A DISTRIBUTED MESSAGE-BASED OPERATING SYSTEM

[75] Inventor: Gabor Simor, Barrington, Ill.

[73] Assignee: Motorola, Inc., Schaumburg, Ill.

[21] Appl. No.: 621

[22] Filed: Jan. 5, 1987

[51] Int. Cl.$^5$ .............................................. G06F 13/00
[52] U.S. Cl. ..................... 395/300; 364/DIG. 1; 364/223.6; 364/229; 364/229.3; 364/200; 364/230.6; 364/281.3; 364/284; 364/284.3
[58] Field of Search ............................ 395/200, 650; 364/200 MS File, 900 MS File

[56] References Cited

U.S. PATENT DOCUMENTS

| | | | |
|---|---|---|---|
| 4,466,060 | 8/1984 | Riddle | 364/200 |
| 4,562,535 | 12/1985 | Vincent et al. | 364/200 |
| 4,590,468 | 5/1986 | Stieglitz | 340/825.5 |
| 4,622,633 | 11/1986 | Ceccon et al. | 364/200 |
| 4,677,588 | 6/1987 | Benjamin et al. | 364/900 |

OTHER PUBLICATIONS

Yalamanchile, et al., "Reconfiguration Strategies for Parallel Architectures," Computer, Dec. 1985, pp. 44-61.

Primary Examiner—Joseph L. Dixon
Assistant Examiner—Rebecca L. Rudolph
Attorney, Agent, or Firm—Harold C. McGurk, IV

[57] ABSTRACT

In a distributed system comprising a plurality of nodes, each node is provided with the same set of generic configuration rules which configures the resources for the node according to the application requirements and the hardware configuration of the node. The resource server modules are configurable at run-time by node-based configuration management processes in accordance with information contained in resource definition messages. A resource definition message is derived from a resource template message in accordance with the information contained in the node definition message. Accordingly, adding or modifying resources at a given node can be accomplished at start-up or at run time without affecting the remainder of the system.

28 Claims, 9 Drawing Sheets

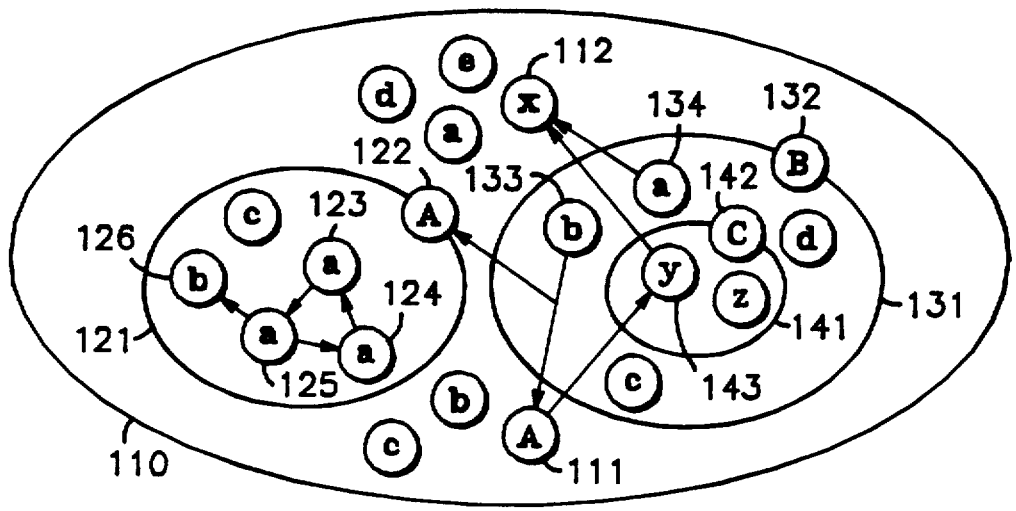
FIG. 5
FIG. 6
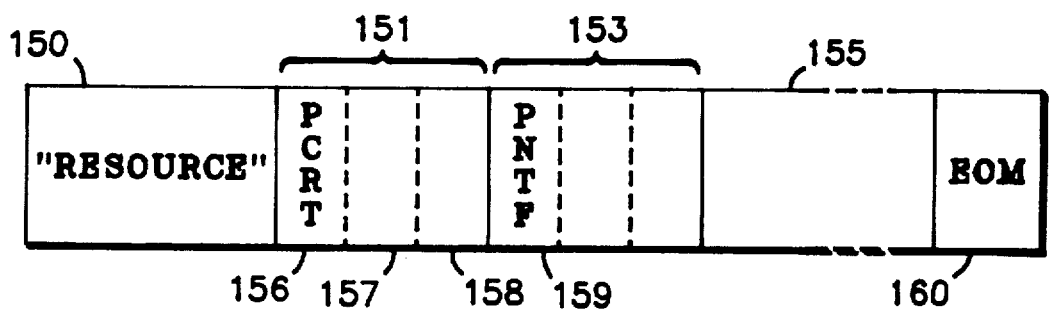

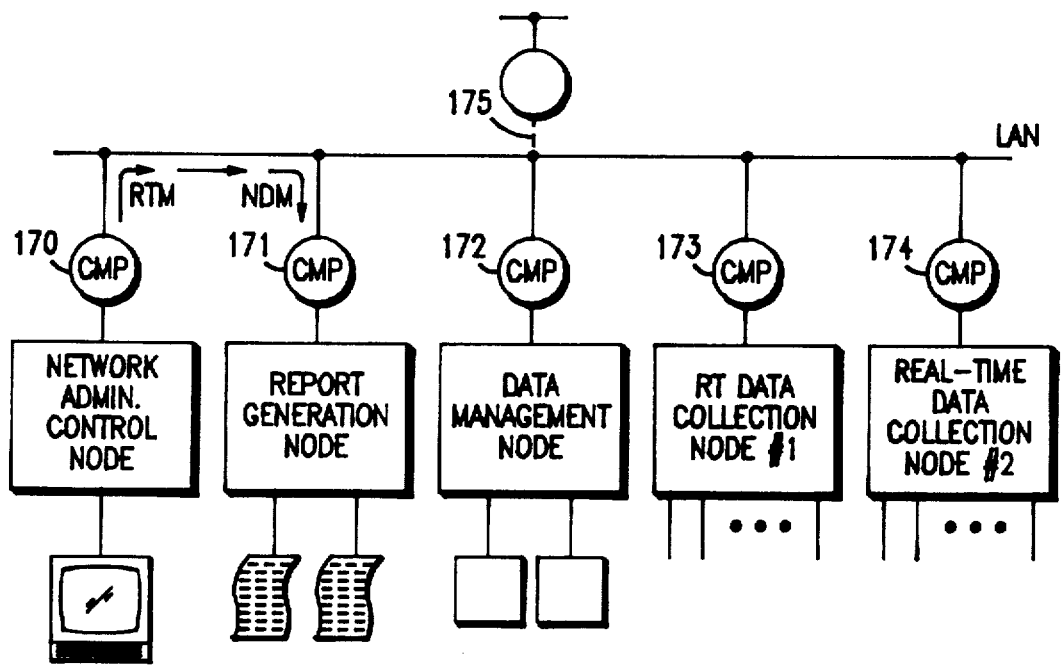
FIG. 7
FIG. 8
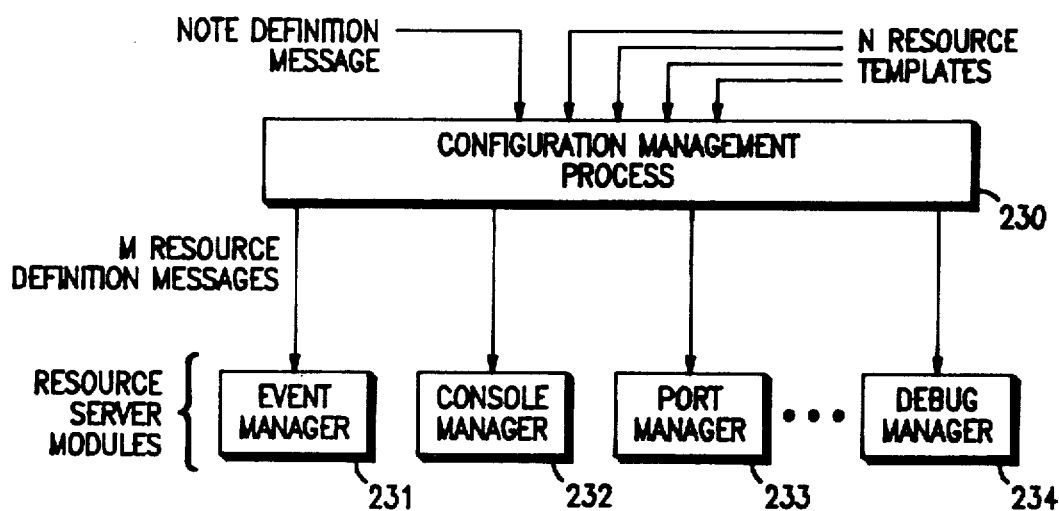

SELF-CONFIGURATION OF NODES IN A DISTRIBUTED MESSAGE-BASED OPERATING SYSTEM

RELATED INVENTIONS

The present invention is related to the following inventions, all filed on May 6, 1986, and all assigned to the assignee of the present invention:

1. Title: Nested Contexts in a Virtual Single Machine
   Inventors: Andrew Kun, Frank Kolnick, Bruce Mansfield
   Serial No.: 730,903, now abandoned and 07/270,437, also abandoned.

2. Title: Computer System With Data Residence Transparency and Data Access Transparency
   Inventors: Andrew Kun, Frank Kolnick, Bruce Mansfield
   Serial No.: 730,929 (now abandoned) and 07/110,614 filed Oct. 19, 1987 (continuation), now U.S. Pat. No. 5,014,192 issued May 7, 1991

3. Title: Network Interface Module With Minimized Data Paths
   Inventors: Bernhard Weisshaar, Michael Barnea
   Serial No.: 730,621, now U.S. Pat. No. 4,754,395 issued Jul. 5, 1988

4. Title: Method of Inter-Process Communication in a Distributed Data Processing System
   Inventors: Bernhard Weisshaar, Andrew Kun, Frank Kolnick, Bruce Mansfield
   Serial No.: 730,892, now U.S. Pat. No. 4,694,396 issued Sep. 15, 1988

5. Title: Logical Ring in a Virtual Single Machine
   Inventor: Andrew Kun, Frank Kolnick, Bruce Mansfield
   Serial No.: 730,923 (now abandoned) and 07/183,469 filed Apr. 15, 1988 (continuation), now U.S. Pat. No. 5,047,925 issued Sep. 10, 1991.

6. Title: Virtual Single Machine With Message-Like Hardware Interrupts and Processor Exceptions
   Inventors: Andrew Kun, Frank Kolnick, Bruce Mansfield
   Serial No.: 730,922, now U.S. Pat. No. 4,835,685 issued May 30, 1989

The present invention is also related to the following inventions, all filed on Jan. 8, 1987, and all assigned to the assignee of the present invention:

7. Title: Computer Human Interface Comprising User-Adjustable Window for Displaying or Printing Information
   Inventor: Frank Kolnick
   Serial No.: 000,625 (abandoned) and 07/355,092 now U.S. Pat. No. 5,062,060 issued Oct. 29, 1991

8. Title: Computer Human Interface With Multi-Application Display
   Inventor: Frank Kolnick
   Serial No.: 000,620 (abandoned) and 07/689,113

9. Title: Object-Oriented Software Architecture Supporting Input/Output Device Independence
   Inventor: Frank Kolnick
   Serial No.: 000,619 (abandoned) and 07/361,738

10. Title: Process Traps in a Distributed Message-Based Operating System
    Inventors: Gabor Simor
    Serial No.: 000,624 (abandoned)

11. Title: Computer Human Interface With Multiple Independent Active Pictures and Windows
    Inventors: Frank Kolnick
    Serial No.: 000,626 (abandoned) and 07/274,674 (abandoned).

TECHNICAL FIELD

This invention relates generally to digital data processing, and, in particular, to a distributed operating system which configures the resources required for each node in real time.

BACKGROUND OF THE INVENTION

The present invention is implemented in a distributed data processing system—that is, two or more data processing systems which are capable of functioning independently but which are so coupled as to send and receive messages to and from one another.

A Local Area Network (LAN) is an example of a distributed data processing system. A typical LAN comprises a number of autonomous data processing "nodes", each comprising at least a processor and memory. Each node is capable of conducting data processing operations independently. In addition, each node is coupled (by appropriate means such as a twisted wire pair, coaxial cable, fiber optic cable, etc.) to a network of other nodes which may be, for example, a loop, star, tree, etc., depending upon the design considerations.

As mentioned above, the present invention finds utility in such a distributed data processing system, since there is a need in such a system for processes which are executing or which are to be executed in the individual nodes to share data and to communicate data among themselves.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i.e., by other processes. Processes can therefore be used to implement "objects", "modules", or other higher-level data abstractions. Each process executes sequentially. Concurrency is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters.

In general, the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and/or supplies it with information it needs to carry out its operation. Each message buffer can have a different length (up to 64 kilobytes). By convention, the first field in the message buffer defines the type of message (e.g., "read", "print", "status", "event", etc.).

Messages are queued from one process to another by name or PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the present invention, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space.

The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

It is known in the data processing arts to utilize an expert system to configure the optimum data processing hardware and software components for shipment to a customer based upon the customer's order. However, such configuration is performed off-line by an independent data processing system.

It is also known to change the number and specific configuration of nodes in a distributed system. However, this capability has previously been able to be performed only by taking the system down, making the necessary changes to the operating system, recompiling, and relinking. It could not be performed in real-time.

There is thus a significant need to be able to provide within a data processing operating system the ability to configure quickly and efficiently the various resources required by each node. Examples of such resources are, for example, terminal ports, windows, files, processes, and I/O devices. Basically in the data processing system of the present invention what is meant by a resource is a logical device which is available to an application. A resource need not necessarily be related to a physical device.

BRIEF SUMMARY OF INVENTION

Accordingly, it is an object of the present invention to provide a data processing system having an improved operating system.

It is also an object of the present invention to provide an improved data processing system having an operating system which allows resources at any node to be quickly and efficiently configured.

It is another object of the present invention to provide an improved data processing system having an operating system which allows resources at any node to be configured at start-up time or at run-time.

It is yet object of the present invention to provide an improved data processing system having an operating system wherein resources can be added or modified at a given node at start-up time or at run-time without adversely affecting the remainder of the system.

These and other objects are achieved in accordance with a preferred embodiment of the invention by providing in a distributed data processing system comprising a plurality of interconnected nodes, at least one of said nodes comprising a set of resource configuration rules for configuring resources on any node of the system, a method of configuring resources for a specific node of the system, the method comprising the steps of a) providing to the specific node a resource definition message and b) utilizing the resource definition message to configure a resource server module for each resource type needed by the specific node.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 5 shows how messages may be sent between processes within nested contexts.

FIG. 6 shows the standard format of a message in a distributed data processing system of the type incorporating the present invention.

FIG. 7 shows how Resource Template Messages, Node Definition Messages, and Resource Server Modules are used in the present invention.

FIG. 8 shows in flow diagram form how Resource Definition Messages are generated to a Resource Server Module.

OVERVIEW OF COMPUTER SYSTEM

Figure 1:
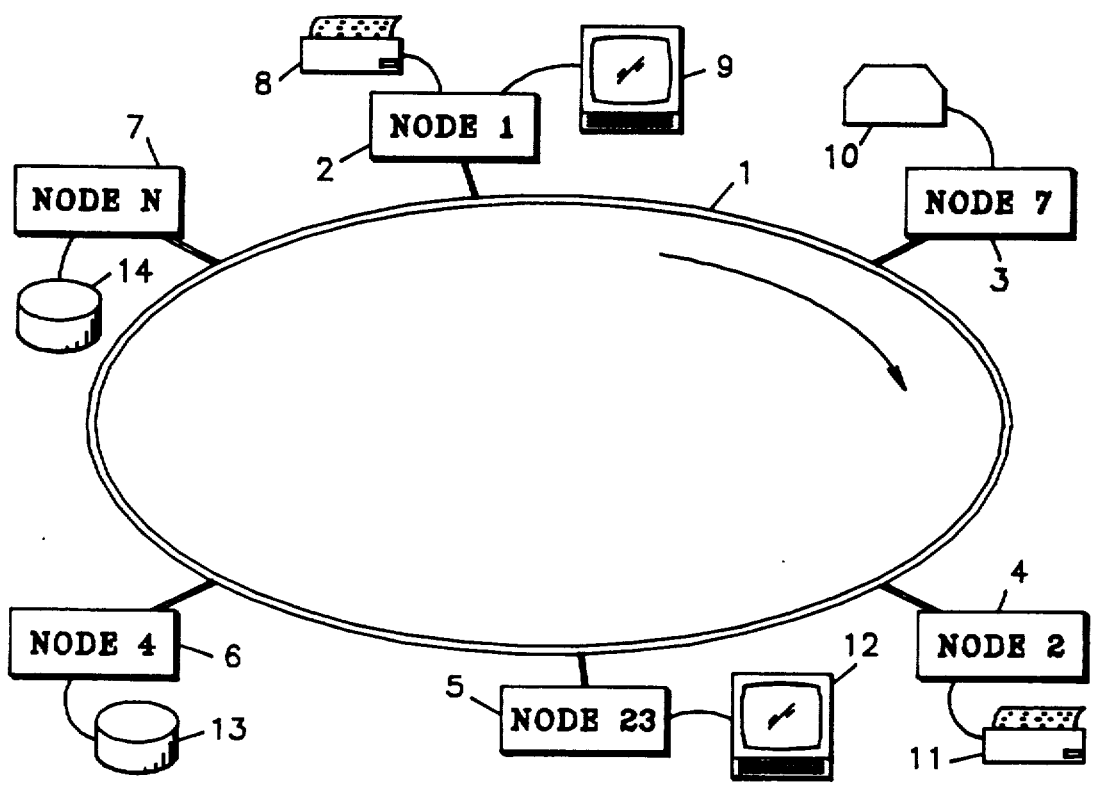
FIG. 1 shows a representational illustration of a single network, distributed message-based data processing system of the type incorporating the present invention.

With reference to FIG. 1, a distributed computer configuration is shown comprising multiple nodes 2-7 (nodes) loosely coupled by a local area network (LAN) 1. The number of nodes which may be connected to the network is arbitrary and depends upon the user application. Each node comprises at least a processor and memory, as will be discussed in greater detail with reference to FIG. 2 below. In addition, each node may also include other units, such as printers 8 and 11, operator display modules (ODM) 9 and 12, mass memory modules 13 and 14, and other I/O device 10.

Figure 2:
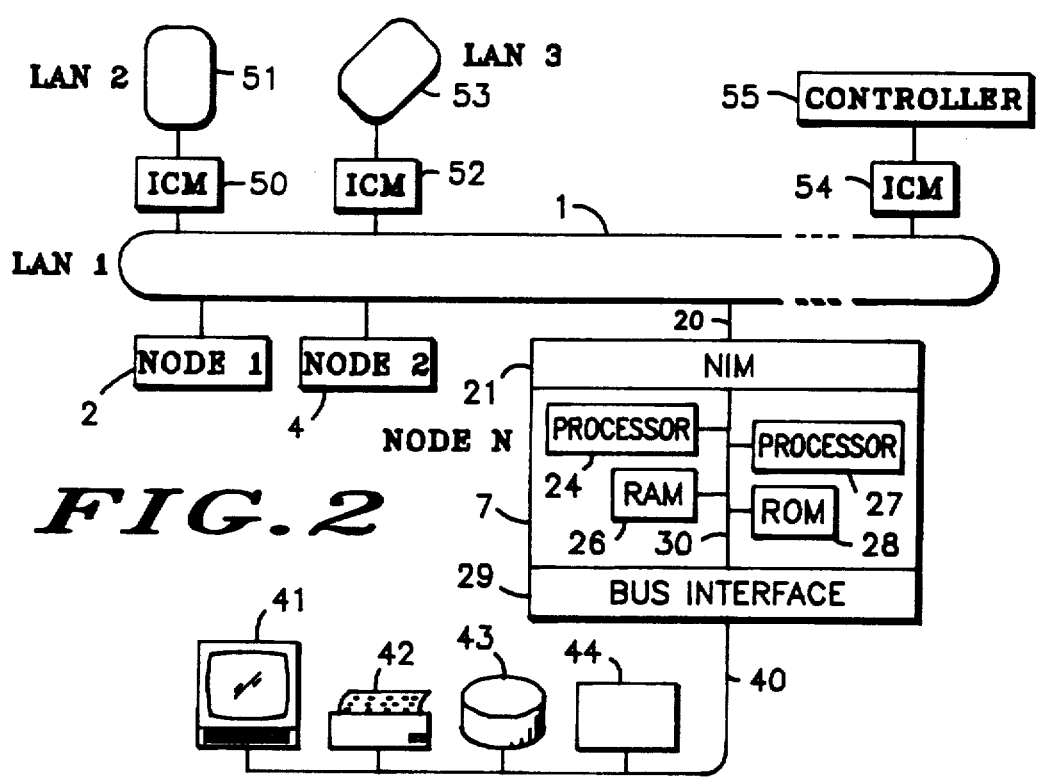
FIG. 2 shows a block diagram illustrating a multiple-network, distributed message-based data processing system of the type incorporating the present invention.

With reference now to FIG. 2, a multiple-network distributed computer configuration is shown. A first local area network LAN 1 comprises several nodes 2,4, and 7. LAN 1 is coupled to a second local area network 51 (LAN 2) by means of an Intelligent Communications Module (ICM) 50. The Intelligent Communications Module provides a link between the LAN and other networks and/or remote processors (such as programmable controllers).

LAN 2 may comprise several nodes (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the node itself can be used as an intelligent peripheral controller (IPC) for specialized devices.

LAN 1 is additionally coupled to a third local area network 51 (LAN 3) via ICM 52. A process controller 55 is also coupled to LAN 1 via ICM 54.

A representative node N (7, FIG. 2) comprises a processor 24 which, in a preferred embodiment, is a processor from the Motorola 68000 family of processors. Each node further includes a read only memory (ROM) 28 and a random access memory (RAM) 26. In addition, each node includes a Network Interface Module (NIM) 21, which connects the node to the LAN, and a Bus Interface 29, which couples the node to additional devices within a node. While a minimal node is capable of supporting two peripheral devices, such as an Operator Display Module (ODM) 41 and an I/O Module 44, additional devices (including additional processors, such as processor 27) can be provided within a node. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single node may comprise all of the above units, in the typical user application individual nodes will normally be dedicated to specialized functions. For example, one or more mass storage nodes may be set up to function as data base servers. There may also be several operator consoles and at least one node for generating hard-copy printed output. Either these same nodes, or separate dedicated nodes, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

Local Area Network

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from node to node at high speed. The current holder of the token may use it to send a "frame" of data or may pass it on to the next node in the ring. The NIM only needs to know the logical address and status of its immediately succeeding neighbor. The NIM's responsibility is limited to detecting the failure of that neighbor or the inclusion of a new neighbor. In general, adjustment to failed or newly added nodes is automatic.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequence-numbered for this purpose. If a frame is not acknowledged within a short period of time, it is re-transmitted a number of times before being treated as a failure.

As described above with reference to FIG. 2, the LAN may be connected to other LAN's operating under the same LAN protocol via so-called "bridgeways", or it may be connected to other types of LAN's via "gateways".

Software Model

The computer operating system of the present invention operates upon processes, messages, and contexts, as such terms are defined herein. Thus this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
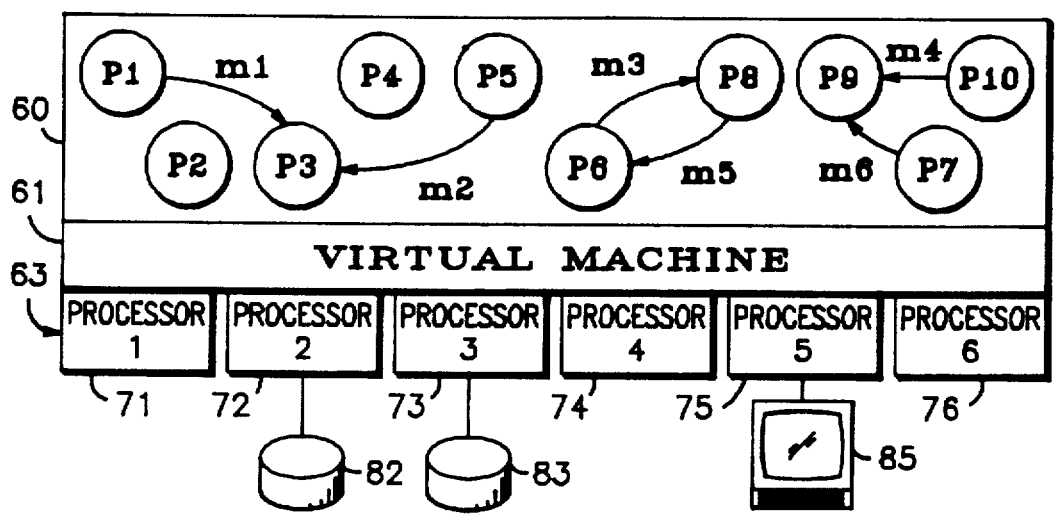
FIG. 3 shows an architectural model of a data processing system of the type incorporating the present invention.

With reference to FIG. 3, an architectural model of the present invention is shown. The bottom, or hardware, layer 63 comprises a number of processors 71-76, as described above. The processors 71-76 may exist physically within one or more nodes. The top, or software, layer 60 illustrates a number of processes P1-P10 which send messages m1-m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

The Virtual Machine

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
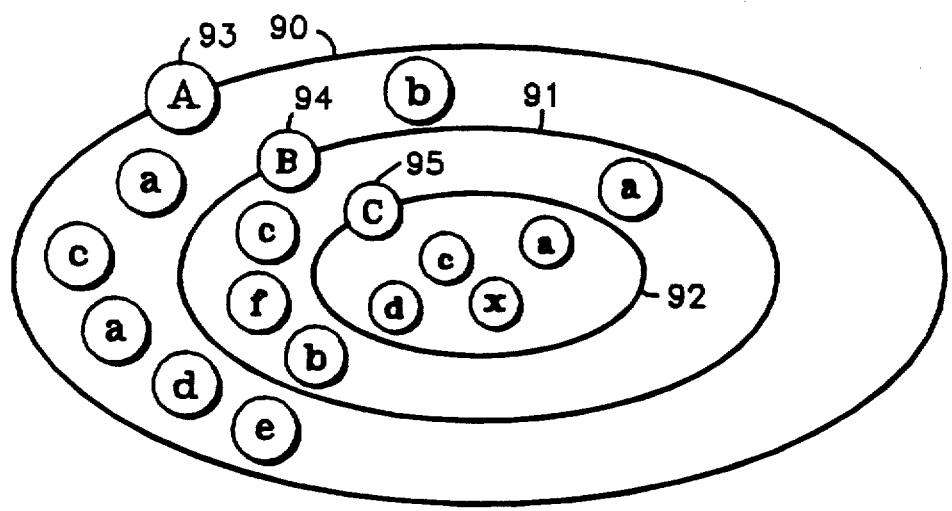
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A-C are context processes for contexts 90-92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one node. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.). Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e., the interfaces between LAN's operating under different network protocols) due to performance degradation. However, they could so operate, depending upon the required level of performance.

Figure 10:
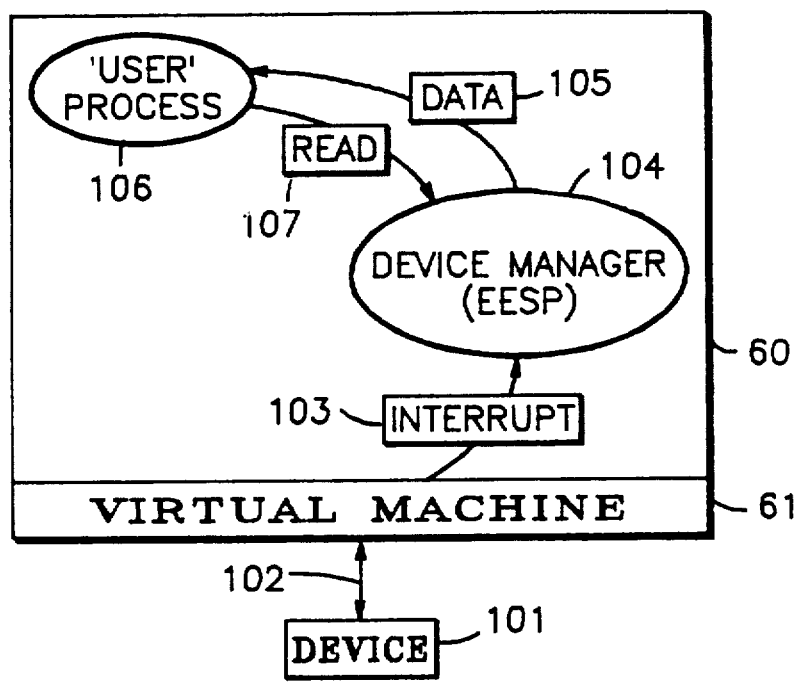
FIG. 10 shows a representational illustration of the relationship of external events to processes.

With reference now to FIG. 10, the relationship of external events to processes will now be described. The virtual machine makes devices look like processes. For example, when an interrupt occurs in an external device 101, the virtual machine kernel 61 queues an interrupt message 103 to a specific process 104, known as an "external event service process" (EESP), functioning as the device manager. For efficiency, the message is preallocated once and circulates between the EESP and the kernel. The message contains just enough information to indicate the occurrence of the event. The EESP performs all hardware-specific functions related to the event, such as setting control registers, moving data 105 to a user process 106, transmitting "Read" messages from the user process 106, etc., and then "releasing" the interrupt.

To become an EESP, a process issues a "connect" primitive specifying the appropriate device register(s). It must execute a "disconnect" before it exits. Device-independence is achieved by making the message protocol between EESP's and applications processes the same wherever possible.

Inter-Process Communication

All inter-process communication is via messages. Consequently, most of the virtual machine primitives are concerned with processing messages. The virtual machine kernel primitives are the following:

ALLOC—requests allocation of a (message) buffer of a given size.
FREE—requests deallocation of a given message buffer.
PUT—end a message to a given destination (by name or PID).
GET—wait for and dequeue the next incoming message, optionally from a specific process (by PID).
FORWARD—pass a received message through to another process.
CALL—send a message, then wait for and dequeue the reply.
REPLY—send a message to the originator of a given message.
ANY_MSG—returns "true" if the receive queue is not empty, else returns "false"; optionally, checks if any messages from a specific PID are queued.

To further describe the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before committing itself to a GET.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 5. The contexts are searched from the current one upward until a match is found or until the system context is reached. All processes with the same name in that context are then queued a copy of the message.

For example, with reference to FIG. 5, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL—to all processes with the given name in the first context which contains that name, starting with the sender's context and searching upwards through all parent contexts.

LOCAL—to all processes with the given name in the sender's context only.

NEXT—to the next process with the given name in the same context as the sender, if any; otherwise it searches upwards through all parent contexts until the name is found.

LEVEL—sends to "self" (the sending process) or to "context" (the context process corresponding to the sender's context); "self" cannot be used with CALL primitive.

DIRECT—sent by PID.

Messages are usually transmitted by queueing a pointer to the buffer containing the message. A message is only copied when there are multiple destinations or when the destination is on another node.

Operating System

The operating system of the present invention consists of a kernel, which implements the primitives described above, plus a set of processes which provide process creation and termination, time management (set time, set alarm, etc.) and which perform node start-up and configuration. Drivers for devices are also implemented as processes (EESP's), as described above. This allows both system services and device drivers to be added or replaced easily. The operating system also supports swapping and paging, although both are invisible to applications software.

Unlike known distributed computer systems, that of the present invention does not use a distinct "name server" process to resolve names. Name searching is confined to the kernel, which has the advantage of being much faster.

A minimal bootstrap program resides permanently (in ROM) on every node, e.g. ROM 28 in node N of FIG. 2. The bootstrap program executes automatically when a node is powered up and begins by performing basic on-board diagnostics. It then attempts to find and start an initial system code module. The module is sought on the first disk drive on the node, if any. If there isn't a disk, and the node is on the LAN, a message will be sent out requesting the module. Failing that, the required software must be resident in ROM. The initialization program of the kernel sets up all of the kernel's internal tables and then calls a predefined entry point of the process.

Thus there is no well-defined meaning for "system up" or "system down"—as long as any node is active, the system as a whole may be considered to be "up". Nodes can be shut down or started up dynamically without affecting other nodes on the network. The same principle applies, in a limited sense, to peripherals. Devices which can identify themselves with regard to type, model number, etc. can be added or removed without operator intervention.

Standard Message Format

FIG. 6 shows the standard format of a message in a distributed data processing system of the type incorporating the present invention. The message format comprises a message i.d. portion 150; one or more "triples" 151, 153, and 155; and an end-of-message portion 160. Each "triple" comprises a group of three fields, such as fields 156-158.

The first field 156 of "triple" 151, designated the PCRT field, specifies that the data field represents the name of the process to be created. The second field 157 of "triple" 151 gives the size of the data field. The third field 158 is the data field.

The first field 159 of "triple" 153, designated the PNTF field, specifies that the data field represents the name of the process to notify when the process specified in the PCRT field has been created.

A message can have any number of "triples", and there can be multiple "triples" in the same message containing PCRT and PNTF fields, since several processes may have to be created for the same resource.

As presently implemented, portion 150 is 16 bytes in length, field 156 is 4 bytes, field 157 is 4 bytes, field 158 is variable in length, and EOM portion is 4 bytes.

Resource/Connector Model

The distributed system of the present invention may be viewed at several levels of complexity. The base level is the virtual machine, which defines and implements the device-independent architecture, consisting of virtual "instructions", i.e. the kernel primitives.

Layered immediately above this, and closely related to it, is the process/message model which defines how programs are configured in the system and how they communicate with each other.

Just above this level is a more abstract model dealing with "resources" and "connectors". As mentioned earlier, resources may be thought of as "logical devices". Resources are accessed through "connectors", which are essentially logical "pointers".

An application must have a connector to a resource in order to interact with it. Connectors are granted and controlled by "resource manager processes", i.e. processes which can be requested to create, delete, etc. resources.

Resource manager processes respond to connector messages to "create" new resources and "delete" old ones, and to "open" an existing resource (i.e. ask for a connection to it) and later to "close" it (terminate the connection to it).

The response to creating a resource, or opening a connection to it, is a connect message. This message contains a service-independent connector data structure which uniquely identifies the resource.

An application may create a new resource, or acquire access to an existing one, by making a request to the appropriate resource manager process. (Note that all resources remain controlled and protected by the resource manager process, and they are kept in its context.) As a result, a connector to the resource is returned to the application, allowing it to communicate directly with the resource. Note that in general two conectors are required—one for the resource manager process, and one for the resource (although in many cases the resource manager process can be accessed by name).

When a connector is received in a message, it identifies a specific resource to which the receiving process has access. The entire connector must be copied into subsequent request message to the resource. The messages themselves are usually sent in "direct" mode, passing the address of the connector. As mentioned above, messages to the resource's manager can be sent by name, if appropriate, or via an explicit connector (to the manager), if available.

Both "create" and "open" requests to the resource manager process usually expect a process name as a parameter, and both return a connection message. A "create" request without a name causes the service to generate a unique name. An "open" request using a connector instead of a name may be employed to access the resource differently or to gain access to a closely related resource. The "delete" and "close" requests may accept either an explicit connector to the resource or the resource's name.

There are five formats for connection messages: "create", which requests the creation of a new resource; "open", which establishes a connection to an existing resource; "delete", which requests that a specified resource be removed from the system; "close", which requests that the connection to a resource be terminated; and "connect", which provides a connection to a resource. The "connect" message normally represents a response to a "create" or "open" request and is not generally sent unsolicited.

Data exchange messages are another type of message used in the distributed system of the present invention. Data in any format is sent solely by means of the "write" message. Data is requested by the "read" message (to which "write" or "failed" are the only responses).

Processes which only generate data should respond with "failed" to "write" requests. Conversely, a write-only resource should return "no data" (i.e. a "write" message without a data "triple") if it receives a "read" request.

There are two formats for data exchange messages: "write", which is used to send data; and "read", which is used to request data. A "write" message includes the source of the data, the destination resource, the originator of the data, the type of data (if known), and it contains a block of data. A "read" message includes the destination resource, an optional prompt string (which must be written exactly before any data is read), and a protect parameter which indicates that the input should be protected if possible.

Appropriate status messages are used to convey the completion status of a request, or the current state of a sevice or resource. In the latter case, the status message may be requested explicitly or may be sent as the result of a synchronous event within the resource itself.

There are four formats for status messages: "query", which asks for the current status of a resource; "done", which indicates that a previous request has successfully completed; "failed", which indicates that a previous request has not completed; and "status", which gives the status of a resource, either in response to "query" or as the result of an asynchronous condition.

DETAILED DESCRIPTION OF THE INVENTION

Resource Template Messages and Resource Definition Messages

In the distributed system of the present invention there are one or more nodes. Each node comprises a set of Resource Server Modules. A Resource Server Module is a process that controls one or more particular resources of the same class. For example, a Resource Server Module may take the form of a data manager, human interface manager, network interface module (NIM), port manager, message server, debugger, console manager, event manager, command line interpreter, etc. Each Resource Server Module is run-time configurable in accordance with information contained within a Resource Definition Message.

A Resource Service Module consists of at least one resource manager process described above in the section entitled "Resource/Connector Model", and it is also the granule of self-configuration of the node which is controled by Resource Definition Messages. It is also fully responsible for autonomously configuring and controlling further possible processes within or outside of the context of the main resource manager process if it is necessary for serving the particular class of resources.

The Resource Server Modules are themselves created by a Configuration Management Process resident on each node. It is the responsibility of the Configuration Management Process to select and create the Resource Server Modules for its node, and to compose and send the appropriate Resource Definition Messages to the Resource Server Module in accordance with the given configuration requirements.

A Resource Definition Message is what provides all of the attributes of the resource to be served as well as all relevant attributes of the running environment. The Resource Definition Message tells how to configure the resource and tells the Resource Server Module what to do. Each Resource Definition Messages is derived from a Resource Template Message.

A Resource Template Message is what defines the attributes of a resource for all node environments that are reasonable to expect. Resource Template Messages contain the necessary rules and information for enabling each nodal subsystem to configure itself. A Resource Template Message is a generic form of Resource Definition Message. There are generally a plurality of Resource Template Message for the entire system.

Configuration Control Attributes

Each Resource Template Message, Resource Definition Message, and Node Definition Message comprises a set of attributes. An attribute includes an attribute name and an attribute value.

Resource Template Messages contain a set of special attributes called the Configuration Control Attributes. These attributes control the implementation of Resource Definition Messages from a Resource Template Message by the Configuration Management Process.

The Configuration Control Attributes and their meanings are given as follows:

FEATURE—the whole resource is conditional on a Node Definition Message attribute SUBSTITUTE—a Node Definition Message attribute value is to be used as a Resource Definition Message attribute CONDITIONAL—a Resource Definition Message attribute has values conditional on Node Definition Message attributes FILE—the content of a specific file is to be used as Resource Definition Message attribute value ADDRESS/NO ADDRESS—the whole resource is conditional on the existence or absence of a given bus address PROCESS/NO PROCESS—the whole resource is conditional on the existence or absence of a process with a given name CREATE RSM—create a Resource Server Module NOTIFY RSM—send this Resource Definition Message to a Resource Server Module GLOBAL—the Resource Server Module has to be transparently accessible in the network; if set, the synchronization and connection to this resource can be requested anywhere in the network where needed GROUP—the Resource Definition Message is the header of a group of resources CONNECTION—a Resource Template Message attribute to pool resources into a group OPTION—tells what to do if the resource service cannot be started UP EVENT—an attribute for reporting resource service availability SYNCH—another resource type which the resource service depends upon The FEATURE, SUBSTITUTE, CONDITIONAL, FILE, ADDRESS, NO ADDRESS, PROCESS, and NO PROCESS attributes are the most important, and they are used by the Configuration Management Process to convert the Resource Template Messages into Resource Definition Messages.

Node Template Messages and Node Definition Messages

A Node Definition Message describes the concrete node environment. Generally, there is one Node Definition Message for each node. Node Definition Messages are structured identically to Resource Definition Messages and Resource Template Messages.

A Configuration Management Process composes and sends the appropriate Resource Definition Messages to the Resource Server Modules in accordance with the informational content of a Node Definition Message and all Resource Template Messages. That is, the Configuration Management Process on each node reads the Node Definition Message for that node, as well as all possible Resource Template Messages, and it generates the Resource Definition Messages for that node.

FIG. 7 shows how Resource Template Messages, Node Definition Messages, and Configuration Management Processes are used in the present invention. FIG. 7 shows a distributed system comprising nodes 170-174. Other nodes may also be coupled to this network, as represented by dotted connection 175. Each node requires one or more resources to support it. During the configuration of, for example, node 171, a Configuration Management Process (CMP) resident at node 171 utilizes one or more Resource Template Messages (RTM) and a Node Definition Message (NDM) and generates Resource Definition Messages to the Resource Server Modules (RSM) also resident at node 171.

In general, a Resource Definition Message looks almost like a Resource Template Message, except that values in certain fields are different. This is because the values in certain fields are conditional upon node attributes in the Node Definition Message or upon the content of specified files in the file system.

Node Definition Messages can be derived from Node Template Messages, just as Resource Definition Messages are derived from Resource Template Messages. A Node Template Message is the generalization of all possible Node Definition Messages in the system. In this way several heirarchical layers of self-configuration of the operating system can be built. In the bottom layer there are elementary resources, whereas in the higher layers more complex resource clusters can be configured.

As explained above and in the accompanying flowcharts shown in FIGS. 9A-9D and described hereinafter, Resource Definition Messages are derived by making checks and substitutions from Resource Template Messages and a Node Definition Message. Using appropriate knowledge engineering techniques, an expert system could be utilized to derive Resource Definition Messages from more complex forms of Resource Templates and by also making inferences at run-time in additional checks and substitutions.

If the Resource Template Messages and Node Definition Messages themselves can be generated by an expert system, this makes available a new dimension of configuration expert system hierarchies, with the configuration of run-time resources at the bottom level and configuration of product design at the higher levels.

FIG. 8 shows in flow diagram form how Resource Definition Messages are generated to a Resource Server Module. A Configuration Management Process 230 utilizes a Node Definition Message (which may be derived from a Node Template Message) and a quantity N of Resource Template Messages to generate a quantity M of Resource Definition Messages (M always being less than N). Then Resource Server Modules 231-234 use the Resource Definition Messages to configure the various nodal resources. Examples of these modules are an Event Manager 231, a Console Manager 232, a Port Manager 233, and a Debug Manager 234.

Automatic Configuration of Resources

The initial start-up module of the operating system comprises the kernel, the Process Manager Process, and the Configuration Management Process.

Regarding any node, the Configuration Management Process interprets the Resource Template Messages, and it performs the process notifications and process creations using the services of the kernel and the Process Manager Process, as specified by the Resource Template Messages.

The Resource Definition Messages for initial node start-up are stored in configuration files. In order to access these configuration files, further operating system services must be included in the start-up module, including file management services, the network interface module (NIM), and clock management. These built-in services are also started up by interpreting resource definitions by the Configuration Management Process. There is no difference between the representation and the interpretation of the resource definitions in the configuration files and for the built-in services other than that the latter ones are built into the start-up module.

The configuration and process management services that are requested at node start-up time can be invoked later at any time by sending standard request messages to these service processes. Therefore the operating system is dynamically reconfigurable at run-time.

As described above, the Configuration Management Process at each node reads the Node Definition Message for that node, as well as all possible Resource Template Messages, and it generates the Resource Definition Messages for that node. Each Resource Server Module at the node utilizes the Resource Definition Messages to configure the resources which it controls. Therefore, each Resource Server Module is run-time configurable in accordance with the information contained within the Resource Definition Messages.

Thus adding a new node or changing the features of a node does not require changes in the configuration rules (Resource Template Messages) or in the node descriptions of the rest of the network.

Changes can be made both before start-up and at run-time, since both the configuration and the configuration rule descriptions are represented in data structures (Resource Template Messages and Node Definition Messages) which are accessible at run-time.

New nodes can also be added without any change in configuration information, since it is possible to define default conditions in the Resource Template Messages and/or the Node Definition Messages.

Further, both the Resource Template Messages and the Node Definition Messages can be easily read and processed without any pre-processing, other than checking for conditional attributes. That is, both the Resource Template Messages and Node Definition Messages are represented in standard run-time message structures, and no run-time syntax conversion of the configuration information is needed.

The configuration information represented by the Resource Template Messages and Node Definition Messages can be both fault tolerant and transparent to requesting processes. The Resource Template Message files and Node Definition Message files can be stored on multiple nodes to provide fault tolerance.

The synchronization of configuration events can also be easily managed using the present invention, since the Resource Template Messages may contain synchronization attributes. In starting up the system, certain resources may have to be brought up before others. For example, the Network Interface Module should be initiated before the file management service, which in turn should be initiated before the event management service.

The proper sequencing can be specified by attribute information in the Resource Template Messages. Specifically, a Resource Template Message may identify events which must be reported to the Configuration Management Process in order to make the resource accessible from other RSM's and events which must be reported to the Configuration Management Process prior to the Resource Server Module itself being started.

Thus Resource Server Modules can be moved among various configurations without affecting their implementation so long as the set of Resource Template Messages reflect the proper synchronization interdependencies. This can be changed merely by altering the synchronization information in the Resource Template Messages, rather than by having to alter the operating system code. This is a very important advantage in a distributed operating system.

DESCRIPTION OF PROGRAM LISTINGS

Program Listings A and B contain a "C" language implementation of the concepts relating to the self-configuration of nodes as described hereinabove. These concepts are also represented in flowchart form by FIGS. 9A-9D for the convenience of the reader.

Figure 9A:
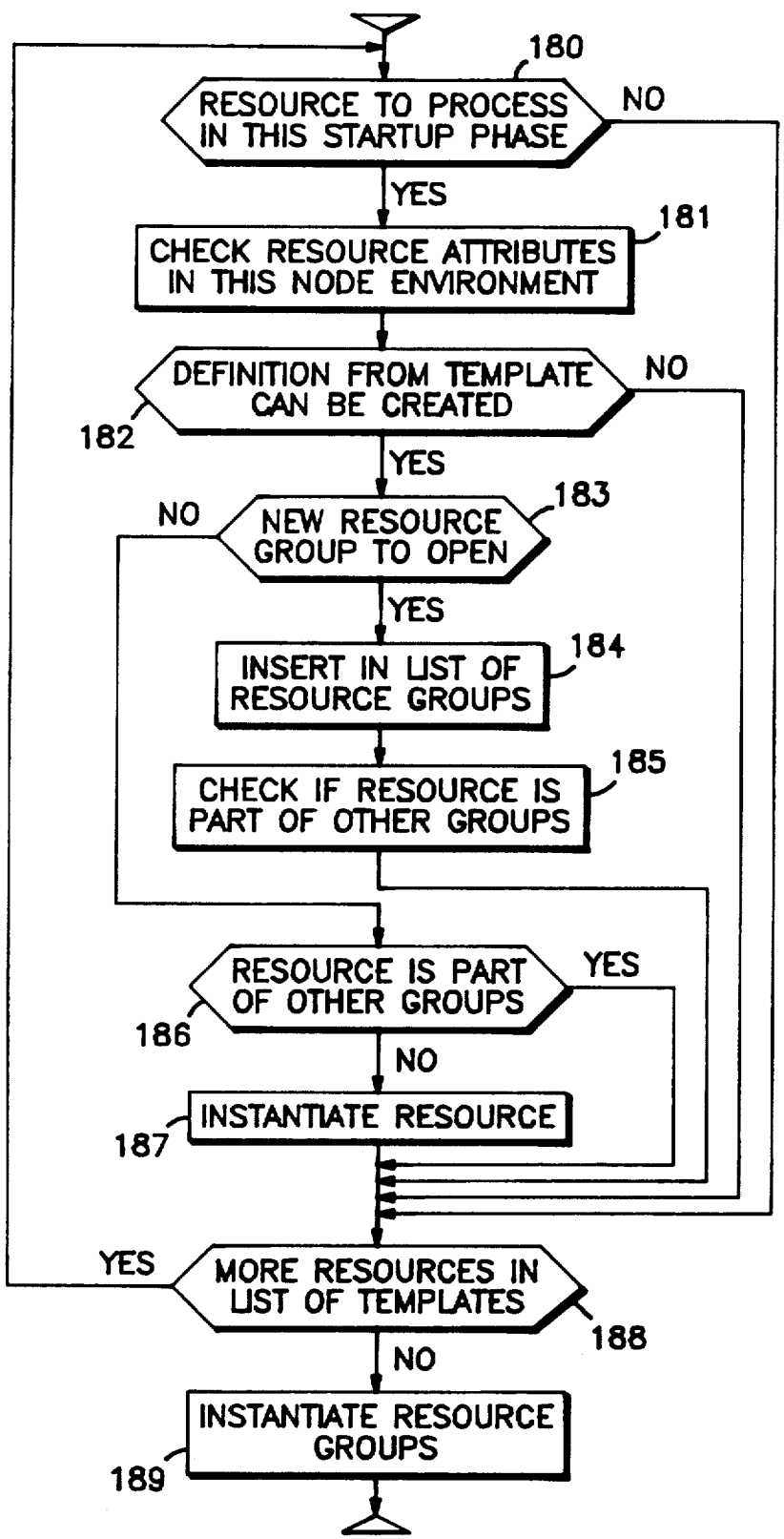
FIG. 9A shows a flowchart illustrating the Initial Resource Processing module of the present invention.

FIG. 9A shows a flowchart illustrating the Initial Resource Processing module of the present invention, which module is contained within Program Listing A attached hereto. In decision block 180 the routine determines whether the resource to process is in this start-up phase. If YES, the routine proceeds to block 181, where the resource attributes are checked in this node environment. In decision block 182 if the definition from the template can be created the routine passes to decision block 183; if not it passes to decision block 188.

In decision block 183, if a new resource group is to be opened the routine passes to block 184, where the new resource group is inserted in the list of resource groups, and then to block 185 to check whether the resource is part of other groups. In decision block 183, if a new resource group is not to be opened, the routine passes to decision block 186.

In decision block 186, if the resource is part of other groups the routine passes to decision block 188. If not, it passes to block 187 where the resource is instantiated (i.e. processes of Resource Server Modules are created, and Resource Definition Messages are created and sent to processes). In decision block 188 if there are no more resources in the list of templates, the routine proceeds to block 189 where the resource groups are instantiated. If there are more resources in the list of templates, the routine returns to decision block 180 for further processing.

Figure 9B:
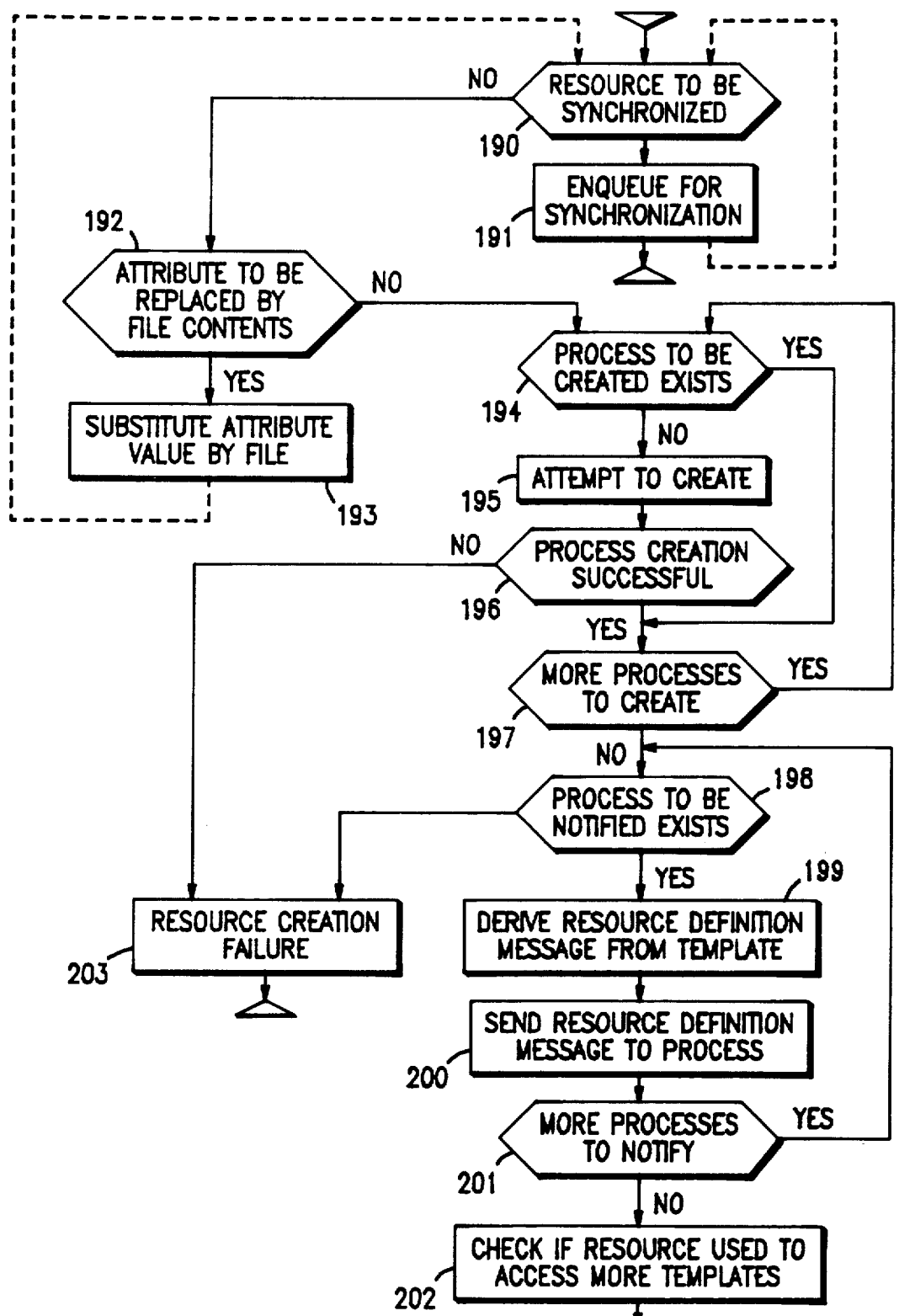
FIG. 9B shows a flowchart illustrating the Instantiate Resource module of the present invention.

FIG. 9B shows a flowchart illustrating the Instantiate Resource module of the present invention, which module is also contained within Program Listing A attached hereto. In decision block 190, if the resource is to be synchronized the routine passes to block 191, where the resource is enqueued for synchronization. If not, it passes to decision block 192.

If the resource is enqueued for synchronization, after the specified synchronization event has been reported to configuration management, the routine is re-entered to proceed with processing this resource template.

In decision block 192, if the resource template specifies any attribute the value of which has to be replaced by a given file content, the routine proceeds to block 193; else it proceeds to block 194. In block 193 the specified file is attempted to be opened in order to start substituting the attribute value by the file content, and the routine exits. It will be re-entered to start processing the resource template again after the file has been read in and the attribute has been modified.

In decision block 194, if the process to be created exists, the routine proceeds to decision block 197. If not, it proceeds to block 195, where an attempt is made to create it. In decision block 196, if the attempt at creating the process was successful, the routine proceeds to decision block 197. If not, it proceeds to block 203, where the resource creation is identified as failed.

In decision block 197, if there are more processes to create, the routine returns to decision block 194, but if not it proceeds to decision block 198. In decision block 198, if the process to be notified exists, the routine passes to block 199, but if not it proceeds to block 203. In block 199 the resource definition message is derived from the resource template message, and the routine then passes to block 200, where the resource definition message is sent to the process.

Then the routine passes to decision block 201, where, if there are more processes to notify, it returns to decision block 198, but if not it proceeds to block 202, where the resource is checked to see if it is to be used to access more templates.

Figure 9C:
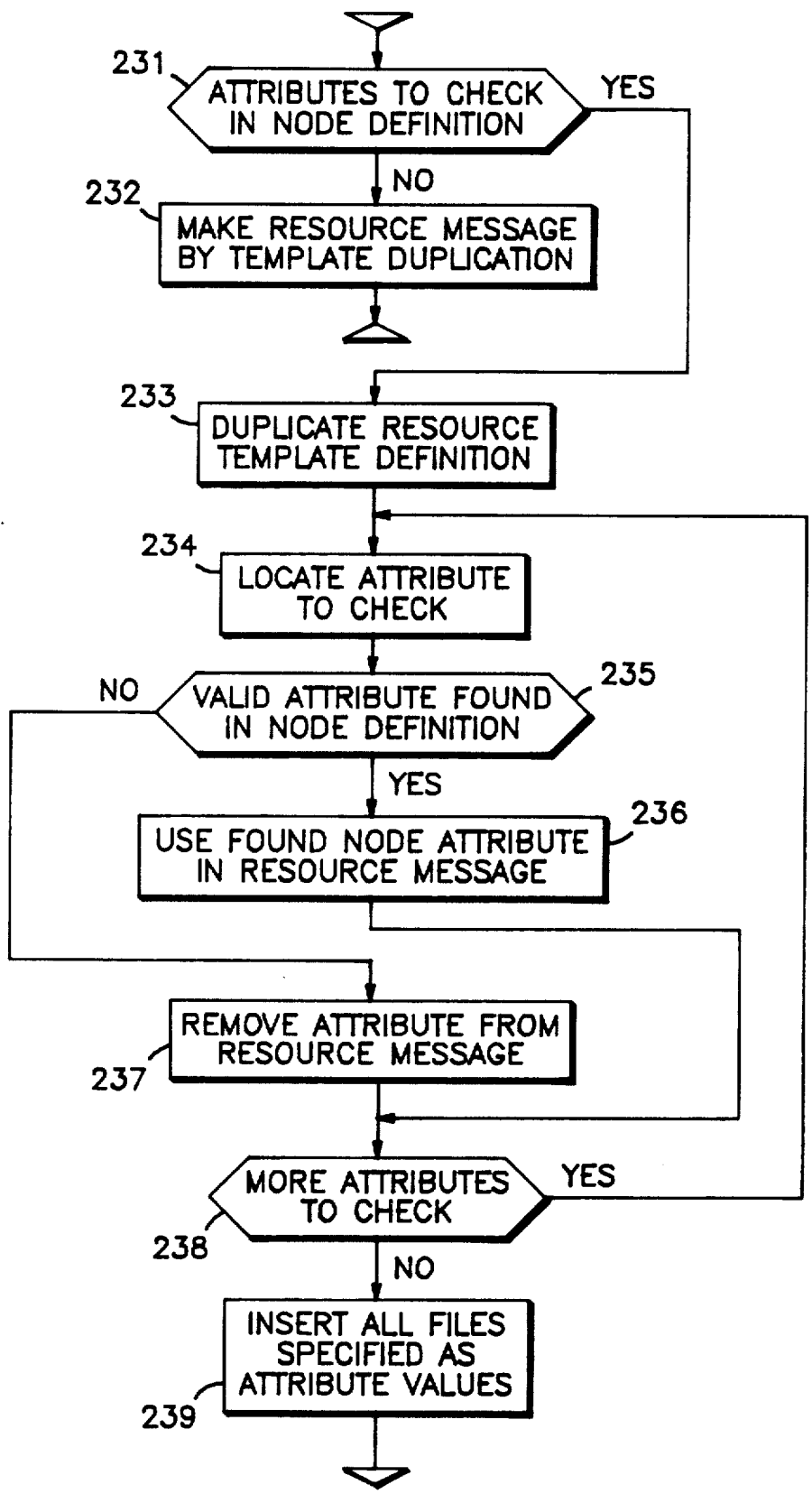
FIG. 9C shows a flowchart illustrating a module to Derive Resource Definition Message from Resource Template.

FIG. 9C shows a flowchart illustrating a module to derive Resource Definition Messages from Resource Template Messages, which module is also contained within Program Listing A attached hereto. In decision block 231, if there are attributes to be checked in the node definition or to be replaced by files, the routine passes to block 233, where the resource template definition is duplicated. If not, the routine proceeds to block 232, where the resource message is made by duplicating the template, and then the routine exits.

After block 233, the routine proceeds to block 234, where a check for attributes is made in the node definition. In decision block 235, if a valid attribute is found in the node definition, the routine proceeds to block 236, but if not it proceeds to block 237. In block 236 the node attribute is used, and the routine proceeds to decision block 238. In block 237 the attribute is removed from the resource message. In decision block 238, if there are more attributes to check, the routine returns to block 234, but if not it proceeds to block 239, where it inserts all file contents that have been specified in the template as attribute values and that all have already been read in the memory.

Figure 9D:
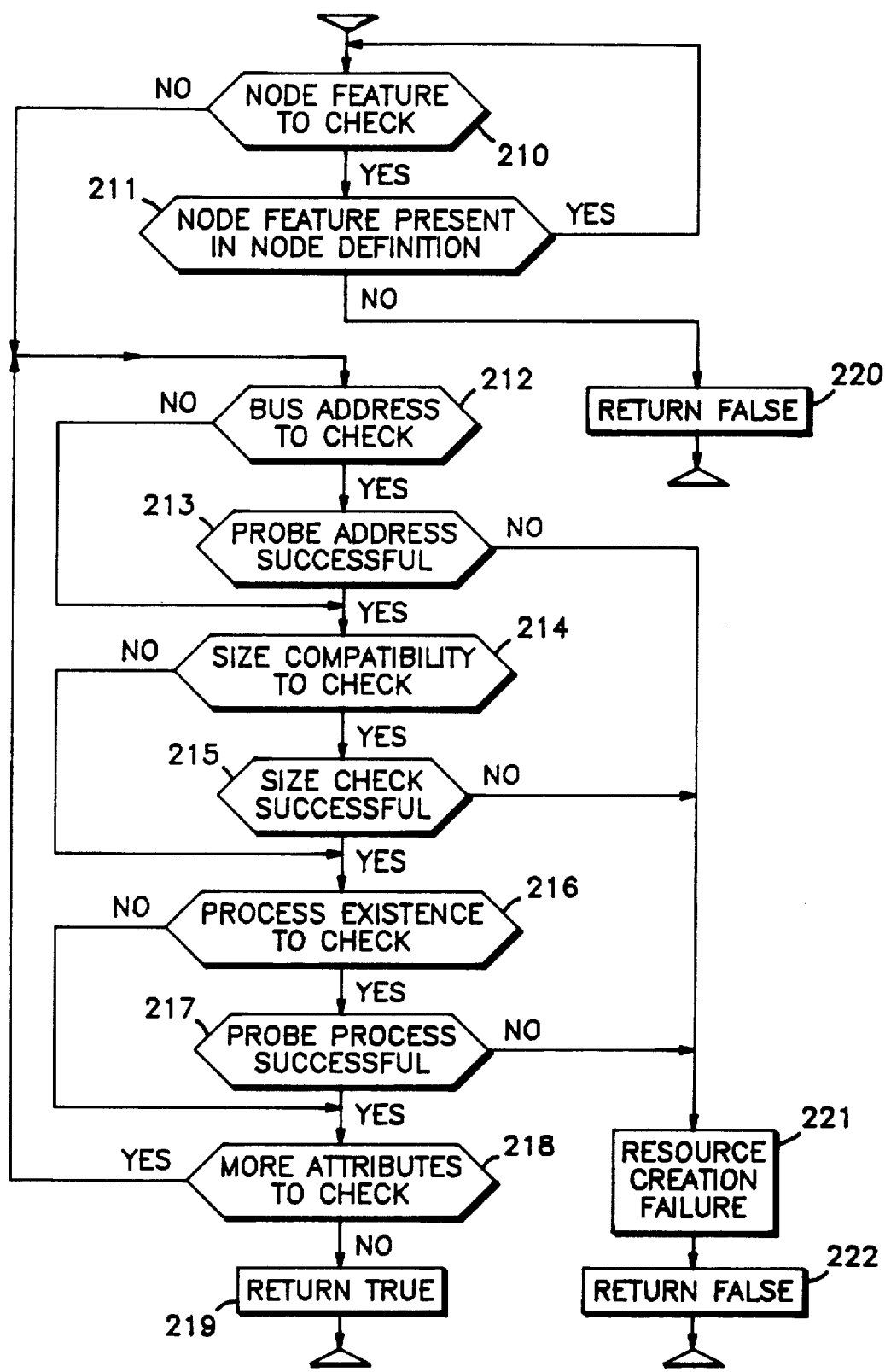
FIG. 9D shows a flowchart illustrating a module to Check Resource Attributes in this Node Environment.

FIG. 9D shows a flowchart illustrating a module to Check Resource Attributes in this Node Environment, which module is contained within Program Listing B attached hereto. In decision block 210, if there is a node feature to check, the routine proceeds to decision block 211, but if not it proceeds to decision block 212. In decision block 211, if the node feature is present in the node definition, the routine returns to decision block 210, but if not it proceeds to block 220, which returns a FALSE status.

In decision block 212, if there is a bus address to check, the routine proceeds to decision block 213, but if not it proceeds to decision block 214. In decision block 213, if the address probe was successful, the routine proceeds to decision block 214, but if not it proceeds to block 221, which indicates a resource creation failure, and hence to block 222, which returns a FALSE status.

In decision block 214, if there is a size compatibility to check, the routine proceeds to decision block 215, but if not it proceeds to decision block 216. In decision block 215, if the size check was successful, the routine passes to decision block 216, but if not it proceeds to block 221.

In decision block 216, if there is a process existence to check, the routine proceeds to decision block 217, but if not it proceeds to block 218. In decision block 217, if the process probe was successful, the routine proceeds to decision block 218, but if not it proceeds to block 221. In decision block 218, if there are more attributes to check, the routine returns to decision block 212, but if not it proceeds to block 219, which returns a TRUE status.

| Correlation of Flowcharts to Program Listings | |
|---|---|
| Initial Resource Processing | Line Numbers in Program Listing A |
| Resource to process in this startup phase | 53-58 |
| Check resource attributes in this node environment | 59 |
| Resource definition from template can be created | 59 |
| New resource group to open | 60 |
| Insert in list of resource groups | 61, 276-280 |
| Check if resource is part of other groups | 62, 306-342 |
| Resource is part of other groups | 65, 306-342 |
| Instantiate resource | 66 |
| More resources in list of resource template | 67-85, 46 |
| Instantiate resource groups | 87 |
| Instantiate Resource | |
| Resource to be synchronized | 127 |
| Enqueue for synchronization | 128, 248-249, 221-236 |
| Attribute to be replaced by file content | 132, 606-634 |
| Substitute attribute value by file | 133, 637-745 |
| Process to be created exists | 139-141 |
| Attempt to create process | 142-144 |
| Process creation successful | 143-144 |
| More processes to create | 138 |
| Process to be notified exists | 165-167 |
| Derive resource definition message from resource template | 177 |
| Send resource definition message to process | 176-178 |
| More processes to notify | 164 |
| Check if resource is used to access more resource templates | 191-199 |
| Derive Resource Definition Message from Resource Template | |
| Attributes to check in node definition | 477 |
| Make resource message by template duplication | 478 |
| Duplicate resource template definition | 480 |
| Locate attribute to check | 481-490 |
| Valid attribute found in node definition | 488-496 |
| Use found node attribute in resource message | 501 |
| Remove attribute from resource message | 495-499 |
| More attributes to check | 481 |
| Insert all files specified as attribute values | 506, 701-718 |
| Check Resource Attributes in this Node Environment | Line Numbers in Program Listing B |
| There is node feature to check | 64 |
| Node feature is present in node definition | 65-76 |
| There is bus address to check | 90, 105, 120 |
| Probe of bus address is successful | 98, 113, 128 |
| There is process existence to check | 157, 169 |
| Probe of process existence is successful | 158-159, 170-171 |
| Size of compatibility has to be checked | 139 |
| Size check is successful | 145 |
| More attributes to check | 84 |

It will be apparent to those skilled in the art that the herein disclosed invention may be modified in numerous ways and may assume many embodiments other than the preferred form specifically set out and described above.

Accordingly, it is intended by the appended claims to cover all modifications of the invention which fall within the true spirit and scope of the invention.

PROGRAM LISTING A

```
 8
 9      Module         : %M% %I%
10      Date submitted : %E% %U%
11      Caretaker      : Gabor Simor
12      Origin         : cX
```

```
13      Description     : Creates and notifies processes about initially availabl
14                       resources.
15      ..........................................................................
16      */
17      #ifndef lint
18      static char SrcId[] = "%Z%%M%:%I%";
19      #endif
20
21      #include <cX.h>
22      #include <os/vers.h>
23      #include "config.h"
24      #include <errm.h>
25      #include <gen_codes.h>
26
27      /*************************************************************************
28         Initial Processing of Resource Messages at startup time
29      *************************************************************************/
30
31      void cm_ini_not(hrdcoded)
32      bool hrdcoded;
33      {
34          extern void notify();
35          extern bool check_in_groups();
36          extern bool check_rsrc();
37          extern void new_group();
38          extern char *res_lst;
39          extern void rls_groups();
40
41          RES_HD *nxt_in_queue, *prv;
42          MSG_HANDLE handle;
43          bool hrdc;
44
45          nxt_in_queue = prv = (RES_HD *) res_lst;
46          while (nxt_in_queue) {
47              Ini_handle(&handle,nxt_in_queue,_,FALSE);
48
49      #if ION(INI_TRACE)
50              printf("resrc started %s\n",Get_triple(&handle,CLSS,_));
51      #endif
52
53              if (Get_triple(&handle,HRDC,_))
54                                  hrdc = TRUE;
55              else
56                                  hrdc = FALSE;
57
58              if((hrdcoded&&hrdc)||((!hrdcoded)&&(!hrdc)))  {
59                 if (check_rsrc(&handle)) {
60                    if (Get_triple(&handle,GRPC,_)) {
61                              new_group(&handle);
62                              check_in_groups(&handle);
63                              }
64                    else
65                       if (!check_in_groups(&handle))
66                                  notify(&handle);
67                    prv = nxt_in_queue;
68                    nxt_in_queue = nxt_in_queue->nxt_res;
69                    }
70
71                 else if (nxt_in_queue != (RES_HD *) res_lst) {
72                    prv->nxt_res = nxt_in_queue->nxt_res;
73                    Free(nxt_in_queue);
74                    nxt_in_queue = prv->nxt_res;
75                    }
76
77                 else
78                    nxt_in_queue = ((RES_HD *) res_lst)->nxt_res;
79                    }
80
81              else {
82                 prv = nxt_in_queue;
83                 nxt_in_queue = nxt_in_queue->nxt_res;
84                 }
85          }
86
87          rls_groups();
88      }
89
```

```
/*****************************************************************
         Instantiate Resource:
                - Create all specified service processes, if do not exist
                - Notify all specified processes, if they do exist
*****************************************************************/ void notify(h)
MSG_HANDLE *h;
{
        extern char *memcpy();
        extern long NewProc();
        extern void bad_rsrc();
        extern char *Nxt_attr();            /* find next given attribute      */
        extern char *instmsg();             /* instantiate a resource message */
        extern void to_syncnot();           /* synch notify with "!sync" msg  */
        extern char *file_in_msg();         /* look for file triples          */
        extern void cm_open();              /* open a triple file             */ extern boot_sync NIM_state;
        extern boot_sync FILE_state;

MSG_HANDLE h1, hrep;
        char *repmsg;                       /* Process_mgt reply              */
        CONNECTOR ntfconn;                  /* proc to be notified on resrc   */
        char *pcrt;                         /* process to create              */
        char *pntf;                         /* process to notify              */
        char *boot_class;                   /* class of hardcoded boot device */
        char *upstr;                        /* upstr to sync with             */
        char *tmpl;                         /* proc templ name in configfile  */
        char *file;                         /* file to read for triple cont   */
        keyword *opkwc;
        char msg_id[MSGID_SIZE], *msid;     /* messageid to be sent           */ if ION(IINI_TRACE)
        printf("%s in notify \n",Get_triple(h,CLSS,_));
endif if (upstr = (char *) Get_triple(h,SYNC,_)) {
             to_syncnot(h,upstr);
             return;
             } if (file = file_in_msg(h,_,FALSE)) {
    cm_open(h,file);
    return;
    }

Ini_handle(&h1,h->msg_start,_,TRUE);
   while (pcrt = Nxt_attr(&h1,PCRT)) {
      if (strcmp("status",(repmsg = Call(NEXT,"Process_mgt",
          Makemsg(4*2*KEYSIZE+strlen(pcrt)+10,"query","name=#s; locl",
                                             pcrt),_,_)))) {
        tmpl = Nxt_attr(&h1,TMPL);
        if ((!NewProcess(pcrt,tmpl,FALSE,-1,_))&&
                                   (!Get_triple(&h1,OPTN,_))) { if ION(IINI_TRACE)
        printf("%s can not be created\n",pcrt);
endif bad_rsrc(h,PROC_CREATE_FAIL);
             Free(repmsg);
             return;
             }
        }

Free(repmsg);
     } if ION(IINI_TRACE)
    printf("%s pcrt's processed \n",Get_triple(h,CLSS,_));
endif Ini_handle(&h1,h->msg_start,_,TRUE);
    while (pntf = Nxt_attr(&h1,PNTF)) {
    if (!strcmp("status",(repmsg = Call(NEXT,"Process_mgt",
         Makemsg(4*2*KEYSIZE+strlen(pntf)+10,"query",
                                 "name=#s; locl", pntf),_,_)))) {
            Ini_handle(&hrep,repmsg,_,TRUE);
```

```
169                 ntfconn = *((CONNECTOR *) Get_triple(&hrep,CONN,_));
170                 if (opkwd = (keyword *) Get_triple(h,OPID,_))
171                         Alt_triple(h,*opkwd,sizeof(ntfconn.pid),&ntfconn.pid);
172                 if (msid = (char *) Get_triple(h,MSID,_))
173                     strcpy(msg_id,msid);
174                 else
175                     strcpy(msg_id,"resource");
176                 Put(DIRECT,&ntfconn,
177                         memcpy(instmsg(h),msg_id,strlen(msg_id)+1));
178                 ((RES_HD *) h->msg_start)->ntfpid = ntfconn.pid;
179                 }
180         else if (!Get_triple(&h1,OPTN,_)) {
181
182 #if LON(LINI_TRACE)
183             printf("%s no process to notify\n",pntf);
184 #endif
185
186             bad_rsrc(h,NO_PROC_TO_NOT);
187             }
188         Free(repmsg);
189         }
190
191         if (Get_triple(&h1,BOOT,_))  {
192             boot_class = Get_triple(&h1,CLSS,_);
193
194             if (!strcmp(boot_class,"LAN"))
195                 NIM_state = polled;
196             else if (!strcmp(boot_class,"disk_ctrl"))
197                 FILE_state = polled;
198             else
199                     bad_rsrc(h,BAD_BOOT_DEV_DEF);
200                 }
201     }
202
203     /*
204             Synchronization notification to continue processing of a pending
205             resource
206     */
207
208     void from_syncnot(sync_hd,resmsg)
209     MSG_HANDLE *sync_hd;
210     char *resmsg;
211     {
212             extern char *Nxt_attr();
213             extern void to_syncnot();
214             extern void Alt_key();
215             extern void notify();
216
217             MSG_HANDLE res_hd;
218             char *upst_in, *upst;
219             bool no_more_sync;
220
221             upst_in = Get_triple(sync_hd,UPST,_);
222             Ini_handle(&res_hd,resmsg,_,NOFIX|SUSP);
223             no_more_sync = TRUE;
224             while (upst = Nxt_attr(&res_hd,SYNC))  {
225                 if (!strcmp(upst,upst_in))
226                             Alt_key(upst,UP);
227                 else {
228                     to_syncnot(&res_hd,upst);
229                     no_more_sync = FALSE;
230                     break;
231                 }
232             }
233
234             if (no_more_sync)
235                     notify(&res_hd);
236             Free(sync_hd->msg_start);
237     }
238
239     /*
240             Ask for synchronization notification that triggers continuation
241             of processing a resource
242     */
243
244     void to_syncnot(h,upst)
245     MSG_HANDLE *h;
246     char *upst;
247     {
```

```
248              Put(SELF,_,Makemsg(2*KEYSIZE+sizeof(h->msg_start)+strlen(upst)+1,
249                    "?synch","upst=#s; sync=#I", upst, h->msg_start));
250      )
251
252
253      void Alt_key(v,k)
254      char *v;
255      keyword k;
256      {
257              v -= 2 * sizeof(k);
258              *((keyword *) v) = k;
259      )
260
261      /*
262              Open new resource group
263      */
264
265      void new_group(h)
266      MSG_HANDLE *h;
267      {
268          extern char *grp_lst;         /* list of resource groups   */
269
270          RES_HD *nxt_in_queue;
271
272      #if ION(LINI_TRACE)
273          printf("%s in new_group\n",Get_triple(h,CLSS,_));
274      #endif
275
276          nxt_in_queue = (RES_HD *) grp_lst;
277          while (nxt_in_queue->nxt_grp)
278              nxt_in_queue = nxt_in_queue->nxt_grp;
279
280          nxt_in_queue->nxt_grp = (RES_HD *) h->msg_start;
281      )
282
283      /*
284          Check if a resource is a component of any group
285          If a resource belongs to more than one group, all group resources bad
286      */
287
288      bool check_in_groups(h)
289      MSG_HANDLE *h;
290      {
291          extern bool check_in_grp();              /* check if in one group      */
292          extern void rmv_rsrc();                  /* remove resource            */
293
294          extern char *grp_lst;                    /* resource group list start */
295
296          RES_HD *nxt_in_queue;                    /* next res group in list     */
297          MSG_HANDLE h1;                           /* current group checked      */
298          MSG_HANDLE hgrp;                         /* located group head resrc   */
299          bool in_a_group;
300          bool grp_rmvd;                           /* group head resrc removed   */
301
302      #if ION(LINI_TRACE)
303          printf("%s in check_in_groups\n",Get_triple(h,CLSS,_));
304      #endif
305
306          grp_rmvd = FALSE;
307          in_a_group = FALSE;
308
309          nxt_in_queue = ((RES_HD *) grp_lst)->nxt_grp;
310          while (nxt_in_queue) {
311              if (nxt_in_queue != (RES_HD *) h->msg_start) {
312
313                  Ini_handle(&h1,(char *) nxt_in_queue,_,TRUE);
314
315                  if (check_in_grp(&h1,h))
316                      if (!in_a_group) {
317                          in_a_group = TRUE;
318                          hgrp = h1;
319
320      #if ION(LINI_TRACE)
321          printf("%s grp head found: %s\n",Get_triple(h,CLSS,_),
322                                           Get_triple(&h1,CLSS,_));
323      #endif
324                      }
325                      else {
326                          bad_rsrc(&h1,DOUBLE_GROUP);
327
```

```
                        rmv_rsrc(&h1);
                    if (!grp_rmvd) {
                        bad_rsrc(&hgrp,DOUBLE_GROUP);
                            rmv_rsrc(&hgrp);
                        }
                        grp_rmvd = TRUE;
                        }
                }
                nxt_in_queue = nxt_in_queue->nxt_grp;
        } if (in_a_group&&!grp_rmvd)
                        return(TRUE);
        else
                        return(FALSE);
}

/*
        Check if a resource is a component of one particular group
        If it is, append it to the component list of the group
                increment msg nr count in each component
*/ static bool check_in_grp(hg,hc)
MSG_HANDLE *hg;                         /* group head handle        */
MSG_HANDLE *hc;                         /* component head handle    */
{

RES_HD *nxt_in_lst;
        keyword keyw;                           /* keywrd to mark group comps */
        unsigned long marksz;                   /* size of the mark attribute */
        char *markg;                            /* ptr to mark attr in grp hd */
        char *markc;                            /* ptr to mark attr in comp   */
        short *msnr;                            /* msg nr following in the grp*/
        long zero;
        short short_zero;

keyw = *((keyword *) Get_triple(hg,GRPC,_));

if (markc = Get_triple(hc,keyw,_)) {
            markg = Get_triple(hg,keyw,&marksz);

if (!strncmp(markg,markc,(int) marksz)) { if LON(LIN!_TRACE)
        printf("%s match found in check_in_grp\n",Get_triple(hg,CLSS,_));
endif msnr = (short *) Get_triple(hg,MSNR,_);
                (*msnr)++;
                Alt_triple(hg,MSNR,sizeof(short),msnr);

nxt_in_lst = (RES_HD *) hg->msg_start;
                while (nxt_in_lst->nxt_comp)
                        nxt_in_lst = nxt_in_lst->nxt_comp;

nxt_in_lst->nxt_comp = (RES_HD *) hc->msg_start;

return(TRUE);
                }
            else
                return(FALSE);
            }
        else
            return(FALSE);
}

/*
        Release all group lists, create and notify all related processes
    (each resource is assumed to have been checked on existance)
*/ static void rls_groups()
{
    extern void notify();
    extern void rls_grp();
    extern char *grp_lst;                   /* list of resource groups */

MSG_HANDLE h;
```

```
407        RES_HD *nxt_in_lst;
408
409        nxt_in_lst = ((RES_HD *) grp_lst)->nxt_grp;
410        while (nxt_in_lst) {
411            Ini_handle(&h,nxt_in_lst,_,TRUE);
412
413 #if LON(LINI_TRACE)
414        printf("%s in rls_groups\n",Get_triple(&h,CLSS,_));
415 #endif
416
417            if (!((RES_HD *) h.msg_start)->ntfpid)
418                                      rls_grp(&h);
419            nxt_in_lst = nxt_in_lst->nxt_grp;
420            }
421 }
422
423 static void rls_grp(hg)
424 MSG_HANDLE *hg;
425 {
426     extern void notify();
427
428     MSG_HANDLE h;
429     RES_HD *nxt_in_lst;
430
431     nxt_in_lst = (RES_HD *) hg->msg_start;
432     while (nxt_in_lst) {
433         Ini_handle(&h,nxt_in_lst,_,TRUE);
434         notify(&h);
435         nxt_in_lst = nxt_in_lst->nxt_comp;
436         }
437 }
438
439 /*
440     Get next field with same keyword from a standard cX message
441     (brand new handle assumed at the 1st call,
442     no external Nxt_triple expected between calls )
443 */
444
445 char *Nxt_attr(h,keyw)
446 MSG_HANDLE *h;
447 keyword keyw;
448 {
449     char *value;
450     keyword k;
451
452     while (value = Nxt_triple(h,&k,_))
453                     if (k == keyw)
454                         return(value);
455     return(NULL);
456 }
457
458 /*
459     Instantiate a message (define node-dependant attributes)
460 */
461
462 char *instmsg(h)
463     MSG_HANDLE *h;
464     {
465             extern char *dupmsg();
466             extern bool attr_name();
467             extern unsigned long Size_triple();
468             extern char *Nxt_attr();
469             extern void ins_file();
470
471             extern RES_HD *node_res;
472
473             MSG_HANDLE h0, h1, h2;
474             keyword *attr_ref, *attr_def;
475             char *attr_val;
476
477             if ((!Get_triple(h,SBST,_)) && (!Get_triple(h,FMRP,_)))
478                                       return(dupmsg(h->msg_start));
479
480             Ini_handle(&h0,dupmsg(h->msg_start),_,NOFIX|SUSP);
481             while (attr_ref = (keyword *) Nxt_attr(&h0,SBST)) {
482               if (!attr_name((char *) attr_ref))
483                     continue;
484                 Ini_handle(&h1,h->msg_start,_,FIX|SUSP);
485                 while (attr_def = (keyword *) Nxt_attr(&h1,*attr_ref)) {
```

```
486             if (!attr_name((char *) attr_def))
487                 continue;
488             else  if (!node_res) {
489                 Del_triple(&h0,*attr_ref);
490                 continue;
491             }
492
493             Ini_handle(&h2,node_res,_,FIX|SUSP);
494             if (!(attr_val = Nxt_attr(&h2,*attr_def))) {
495                 Del_triple(&h0,*attr_ref);
496                 continue;
497             }
498
499             while (Del_triple(&h0,*attr_ref))
500                 ;
501             Add_triple(&h0,*attr_ref,Size_triple(attr_val),attr_val);
502             break;
503         }
504     }
505
506     ins_file(&h0);
507     return(h0.msg_start);
508 }
509
510 /*
511         Duplicate a message
512 */
513
514 char *dupmsg(msg)
515 char *msg;
516 {
517     extern char *memcpy();
518
519     char *newmsg;
520     unsigned long size;
521     MSGINFO msginfo;
522
523     Msg_info(msg,&msginfo);
524     return(memcpy(Alloc(msginfo.size),msg,msginfo.size));
525 }
526
527 /*
528         Return size of a triple
529 */
530
531 static unsigned long Size_triple(val)
532 char *val;
533 {
534     val += sizeof(keyword);
535     return(*((unsigned long *) val));
536 }
537
538 /*
539     Check if triple refers to an attribute name
540 */
541
542 static bool attr_name(val)
543 char *val;
544 {
545     extern  unsigned long Size_triple();
546     extern  bool allascii();
547
548     if (Size_triple(val) != sizeof(keyword))
549         return(FALSE);
550     else
551     return(allascii(val,sizeof(keyword)));
552 }
553
554 static bool allascii(p,k)
555 char *p;
556 int k;
557 {
558     extern  bool my_isascii();
559
560     bool all_ascii;
561     int i;
562
563     all_ascii = TRUE;
564     for (i=0;i<k;i++)
```

```
565                 if (!my_isascii(*(p+i)))
566                         all_ascii = FALSE;
567
568         return(all_ascii);
569 }
570
571 static bool my_isascii(c)
572 char c;
573 {
574         if ( (c>0x1f) && (c<0x7f) )
575                 return(TRUE);
576         else
577                 return(FALSE);
578 }
579
580 /*
581     Routines to replace file reference triples with file content
582
583         file_in_msg(h)         - look for file triples
584         cm_open(h,file)        - open triple file
585         cm_read(ch,conn)       - read a triple file
586         mc_triple(rn,conn)     - mark a triple file as read and close it
587         ins_file(h)            - insert all marked triple files in res msg
588         cm_fmsg_err(tmn)       - check if "failed" is a triple file error
589 */
590
591 static char *file_in_msg(h,keypp,after_read)
592 MSG_HANDLE *h;
593 keyword *keypp;
594 bool after_read;
595     {
596             extern char *Nxt_attr();
597             extern bool attr_name();
598             extern bool allascii();
599             extern void Alt_key();
600
601             MSG_HANDLE h0, h1;
602             keyword file;
603             keyword *attr_ref;
604             char *path;
605
606             if (!after_read)
607                     file = FILE;
608             else
609                     file = FILO;
610
611             if (Get_triple(h,file,_)) {
612                 Ini_handle(&h0,h->msg_start,_,FIX|SUSP);
613                 while (attr_ref = (keyword *) Nxt_attr(&h0,file))
614                     if (!attr_name((char *) attr_ref))
615                                         continue;
616                     else {
617                         Ini_handle(&h1,h->msg_start,_,FIX|SUSP);
618                         while (path = Nxt_attr(&h1,*attr_ref))
619                             if ((allascii(path,strlen(path))) &&
620                                 (*path == '/') && (strlen(path) > 2)) {
621                                 if (after_read)
622                                     Alt_key(attr_ref,MFIL);
623                                 else
624                                     Alt_key(attr_ref,FILO);
625                                 if (keypp)
626                                     *keypp = *attr_ref;
627                                 return(path);
628                             }
629                             else
630                                 continue;
631                     }
632             }
633
634             return(NULL);
635     }
636
637 static void cm_open(h,file)
638 MSG_HANDLE *h;
639 char *file;
640 {
641         char *opmsg;
642
643         opmsg = Makemsg(MINSIZE+3*2*KEYSIZE+strlen(file)+12,"open",
```

```
644                               "name=#s; omod=#s; amod=#s", file,"R","R");
645                   Msg_parm(opmsg, (char *) h->msg_start);
646                   Put(NEXT,"File_mgt", opmsg);
647         }
648
649    void cm_read(h,conn)
650    MSG_HANDLE *h;
651    CONNECTOR      *conn;
652    {
653           extern void read_file();
654
655           read_file(h,conn);                    /* same as in Process_mgt     */
656    }
657
658    void cm_triple(h,conn)
659    MSG_HANDLE *h;
660    CONNECTOR      *conn;
661    {
662        extern void close_file();        /* same as in Process_mgt      */
663        extern char *file_in_msg();      /* find first file triple value */
664        extern void Alt_key();           /* change key field of a triple */
665        extern void bad_rsrc();          /* change key field of a triple */
666
667        MSGINFO msginfo;
668        MSG_HANDLE reshndl;
669        char *resmsg, *path, *file1;
670        keyword keyp;
671
672        Msg_info(h->msg_start,&msginfo);
673        resmsg = (char *) msginfo.tag;
674        Ini_handle(&reshndl,resmsg,_,SUSP|NOFIX);
675
676        close_file(h,conn);
677        path = file_in_msg(&reshndl,&keyp,TRUE);
678        Add_triple(h,KEYP,sizeof(keyp),&keyp);
679        *((char **) path) = h->msg_start;
680        Alt_key(path,FMRP);
681
682        if (!Get_triple(&reshndl,FILO,_))
683            if (!Get_triple(&reshndl,BADF,_))
684                          notify(&reshndl);
685            else
686                          bad_rsrc(&reshndl,FILE_READ_ERROR);
687    }
688
689    static void ins_file(h)
690    MSG_HANDLE *h;
691    {
692        extern void Alt_key();
693
694        MSG_HANDLE hres, hfmrep;
695        char *fmrep, **fmrepp;
696        char *fdata;
697        char *fptr;
698        unsigned long fdsize;
699        keyword *keypp;
700
701        if (Get_triple(h,FMRP,_)) {
702            Ini_handle(&hres,h->msg_start,_,FIX|SUSP);
703            while (fmrepp = (char **) Nxt_attr(&hres,FMRP)) {
704                    fmrep  = *fmrepp;
705                    Ini_handle(&hfmrep,fmrep,_,FIX|SUSP);
706                    fdata = Get_triple(&hfmrep,DATA,&fdsize);
707                    keypp = (keyword *) Get_triple(&hfmrep,KEYP,_);
708                    Add_triple(h,*keypp,fdsize,fdata);
709                    free(fmrep);
710                    }
711
712                Ini_handle(&hres,h->msg_start,_,FIX|SUSP);
713                while (fptr = Nxt_attr(&hres,MFIL))
714                                   Alt_key(fptr,FILE);
715
716                Ini_handle(&hres,h->msg_start,_,FIX|SUSP);
717                while (Del_triple(&hres,FMRP))
718                                   ;
719            }
720    }
721
722    bool cm_fmgt_err(fmh)
```

```
723         MSG_HANDLE *fmh;
724         {
725             extern char *file_in_msg();
726
727             MSGINFO msginfo;
728             MSG_HANDLE reshndl;
729             char *resmsg, *path, *req;
730             keyword keyp;
731
732             req = Get_triple(fmh,REQ,_);
733             if (!strcmp(req,"close"))
734                             return(TRUE);
735
736             Msg_info(fmh->msg_start,&msginfo);
737             resmsg = (char *) msginfo.tag;
738
739             if (Ini_handle(&reshndl,resmsg,_,SUSP|NOFIX))
740                 if (path = file_in_msg(&reshndl,&keyp,TRUE)) {
741                                     Alt_key(path,BADF);
742                                     return(TRUE);
743                                     }
744
745             return(FALSE);
746         }
```

PROGRAM LISTING B

```
9       Module          : %M% %I%
10      Date submitted  : %E% %U%
11      Author          : Gabor Simor
12      Origin          : cX
13      Description     : Configuration Management Error Handling Routins
14
15      *******************************************************************/
16
17  #ifndef lint
18  static char SrcId[] = "%Z%%M%:%I%";
19  #endif
20
21  #include <cX.h>
22  #include <os/vers.h>
23  #include "config.h"
24  #include <errm.h>
25  #include <gen_codes.h>
26
27  /*
28      Check if resource available and if its attributes are consistent
29      with the environment
30  */
31
32  bool check_rsrc(h)
33  MSG_HANDLE *h;
34  {
35      extern void bad_rsrc();
36      extern bool comptbl_size();
37      extern char *Nxt_attr();
38      extern char *instmsg();
39
40      extern RES_HD *node_res;
41
42      char *chck;           /* attribute to check              */
43      char *badr;           /* bus address                     */
44      char *size;           /* buffer size of comms protocols  */
45      char *res_feat;       /* node feature to be checked      */
46      char *p_name;         /* process name to be checked      */
47      char *repmsg;         /* reply message from Proc_mgt     */
48      char *node_feat;      /* node feature found              */
49      bool resolvec;        /* if current feature resolved     */
50      MSG_HANDLE h0, h1, hsub;
51      int dontcare;
52
53      Ini_handle(&hsub,instmsg(h),_,FIX|SUSP);
54
```

```
55    #if ION(LINI_TRACE)
56        printf("%s in check_rsrc\n",Get_triple(h,CLSS,_));
57    #endif
58
59    /*
60        check if associated node feature required
61    */
62
63        Ini_handle(&h0,hsub.msg_start,_,FIX|SUSP);
64        while (res_feat = Nxt_attr(&h0,FEAT)) {
65            if (!node_res) {
66                Free(hsub.msg_start);
67                return(FALSE);
68            }
69            resolved = FALSE;
70            Ini_handle(&h1,node_res,_,FIX|SUSP);
71            while (node_feat = Nxt_attr(&h1,FEAT))
72                if (!strcmp(node_feat,res_feat)) {
73                    resolved = TRUE;
74                    break;
75                }
76            if (!resolved) {
77                Free(hsub.msg_start);
78                return(FALSE);
79            }
80        }
81
82
83        Ini_handle(&h0,hsub.msg_start,_,FIX|SUSP);
84        while (chck = Nxt_attr(&h0,CHCK)) {
85
86    /*
87        check on bus address existence
88    */
89
90            if (*((long *) chck) == BADR) {
91
92    #if ION(LINI_TRACE)
93                printf("%s to be checked on BADR\n",Get_triple(h,CLSS,_));
94    #endif
95
96                Ini_handle(&h1,hsub.msg_start,_,FIX|SUSP);
97                while (badr = Nxt_attr(&h1,BADR))
98                    if (!Mprobe(MP_RDB,*((unsigned long *) badr),&dontcare)) {
99                        bad_rsrc(h,BADR_NONEXT);
100                       Free(hsub.msg_start);
101                       return(FALSE);
102                   }
103           }
104
105           else if (*((long *) chck) == YADR) {
106
107   #if ION(LINI_TRACE)
108               printf("%s to be checked on BADR\n",Get_triple(h,CLSS,_));
109   #endif
110
111               Ini_handle(&h1,hsub.msg_start,_,FIX|SUSP);
112               while (badr = Nxt_attr(&h1,YADR))
113                   if (!Mprobe(MP_RDB,*((unsigned long *) badr),&dontcare)) {
114                       bad_rsrc(h,BADR_NONEXT);
115                       Free(hsub.msg_start);
116                       return(FALSE);
117                   }
118           }
119
120           else if (*((long *) chck) == NADR) {
121
122   #if ION(LINI_TRACE)
123               printf("%s to be checked on BADR\n",Get_triple(h,CLSS,_));
124   #endif
125
126               Ini_handle(&h1,hsub.msg_start,_,FIX|SUSP);
127               while (badr = Nxt_attr(&h1,NADR))
128                   if (Mprobe(MP_RDB,*((unsigned long *) badr),&dontcare)) {
129                       bad_rsrc(h,BADR_EXIST)
130                       Free(hsub.msg_start);
131                       return(FALSE);
132                   }
```

```
133         )
134
135  /*
136     check on consistency of size attributes
137  */
138
139         else if (*((long *) chck) == SIZE)
140             if (!(size = Get_triple(h,SIZE,_))) {
141                                              bad_rsrc(h,NO_SIZE_TO_CHECK);
142                                              Free(hsub.msg_start);
143                                              return(FALSE);
144                                              )
145             else if (!comptbl_size(h,*((long *) size))) {
146                                              bad_rsrc(h,INCOMPTBL_SIZE);
147                                              Free(hsub.msg_start);
148                                              return(FALSE);
149                                              )
150         )
151
152  /*
153     check if process existance conditions satisfied
154  */
155
156         Ini_handle(&h1,hsub.msg_start,_,FIX|SUSP);
157         while (p_name = Nxt_attr(&h1,PROC))
158             if (strcmp("status",(repmsg = Call(NEXT,"Process_mgt",Makemsg
159                 (2*2*KEYSIZE+strlen(p_name)+1,"query","name#s; locl",p_name),_,_
160                                              bad_rsrc(h,PROC_NONEXT);
161                                              Free(hsub.msg_start);
162                                              Free(repmsg);
163                                              return(FALSE);
164                                              )
165             else
166                 Free(repmsg);
167
168         Ini_handle(&h1,hsub.msg_start,_,FIX|SUSP);
169         while (p_name = Nxt_attr(&h1,NPRC))
170             if (strcmp("failed",(repmsg = Call(NEXT,"Process_mgt",Makemsg
171                 (2*2*KEYSIZE+strlen(p_name)+1,"query","name#s; locl",p_name),_,_
172                                              bad_rsrc(h,PROC_EXIST);
173                                              Free(hsub.msg_start);
174                                              Free(repmsg);
175                                              return(FALSE);
176                                              )
177             else
178                 Free(repmsg);
179
180         Free(hsub.msg_start);
181         return(TRUE);
182  )
```

What is claimed is:

1. In a distributed data processing system comprising a plurality of interconnected nodes, each of said nodes comprising a processor and a memory coupled to said processor, at least one of said nodes comprising a set of resource configuration rules stored in said memory for configuring a resource on any node of the system, a method of configuring said resource for a specific node during run-time operation of said system, steps of said method being executed by said system as part of a computer program, said method comprising the steps of:
   a) providing said node with a configuration management process;
   b) providing said node with a resource definition message for each resource type needed by said node; and
   c) utilizing said configuration management process and said resource definition message to configure a resource server module which controls said resource.

2. The method of configuring resources recited in claim 1, wherein said resource definition message is derived from a resource template message which defines the attributes of a resource for all anticipated node environments.

3. The method of configuring resources recited in claim 2, wherein said set of resource configuration rules comprises a plurality of resource template messages.

4. The method of configuring resources recited in claim 1, wherein said specific node comprises a plurality of resource server modules each of which is configured by a resource definition message.

5. In a distributed data processing system comprising a plurality of interconnected nodes, each of said nodes comprising a processor and a memory coupled to said processor, a method of configuring resources during run-time operation of said system for one of said nodes, steps of said method being executed by said system as part of a computer program, said method comprising the steps of:
   a) providing in said one node a configuration management process;
   b) providing said one node with a node definition message which defines a configuration for said one node;

c) providing said one node with a plurality of resource template messages which represent a set of generic configuration rules;

d) using said configuration management process, said node definition message, and said resource template messages to create a resource server module for controlling a resource class required by said one node;

e) providing to said resource server module a resource definition message; and f) using said resource definition message to configure said resource server module.

6. The method of configuring resources recited in claim 5, wherein said node definition message is derived from a node template message which defines the possible attributes of a node for all anticipated types of nodes in the system.

7. The method of configuring resources recited in claim 5, wherein a particular resource definition message is derived from a particular resource template message which defines the possible attributes of a particular resource defined by said particular resource definition message for a node environment.

8. The method of configuring resources recited in claim 7, wherein said resource template message contains synchronization information, and wherein said configuration management process creates a plurality of resources in accordance with said synchronization information.

9. The method of configuring resources recited in claim 7, wherein said resource template message contains attribute information which controls the implementation of each resource definition message.

10. The method of configuring resources recited in claim 7, wherein said node definition message, said resource template message, and each resource definition message contain attribute information which controls the configuration of resources for said one node.

11. The method of configuring resources recited in claim 10, whereby, in response to attribute information in said resource template message, the creation of a resource is conditioned upon the presence of a particular attribute information in said node definition message.

12. The method of configuring resources recited in claim 10, whereby, in response to attribute information in said resource template message, the creation of a resource is conditioned upon the presence of a particular attribute information in said node definition message and upon the presence or absence of processes and addresses.

13. The method of configuring resources recited in claim 10, whereby, in response to attribute information in said resource template message, predetermined attribute information in said node definition message is substituted for attribute information in at least one of said resources definition messages.

14. The method of configuring resources recited in claim 10, whereby, in response to attribute information in said resource template message, the content of a specified file residing on said plurality of interconnected nodes is substituted for said attribute information in at least one of said resource definition messages.

15. The method of configuring resources recited in claim 10, whereby, in response to an attribute information in said resource template message, a value of particular attribute information in said node definition message is substituted for a value of said particular attribute information in one of said resource definition messages.

16. The method of configuring resources recited in claim 10, whereby, in response to attribute information in said resource template message, a set of resource definition messages is defined each representing one of a group of resources.

17. The method of configuring resources recited in claim 10, whereby, in response to attribute information in said resource template message, the creation of said resource is conditioned upon the availability of at least one other type of resource.

18. The method of configuring resources recited in claim 5, wherein each resource definition message is generated by an expert system in response to at least one resource template message and at least one node definition message.

19. The method of configuring resources recited in claim 5, wherein each resource template message is generated by an expert system.

20. The method of configuring resources recited in claim 5, wherein said node definition message is generated by an expert system.

21. The method of configuring resources recited in claim 5, wherein said one node comprises a plurality of resource server modules each of which is configured by a resource definition message or a group of related resource definition messages.

22. The method of configuring resources recited in claim 5, whereby a new node can be configured in said system by providing to said new node a new node definition message and said plurality of resource template messages.

23. The method of configuring resources recited in claim 5, whereby the configuration of said one node can be modified by providing to said node a subsequent resource template message.

24. In a distributed data processing system comprising a plurality of interconnected nodes, each of said nodes comprising a processor and a memory coupled to said processor, a method of configuring resources at least one of said nodes during run-time operation of said system, steps of said method being executed by said system as part of a computer program, said method comprising the steps of:

a) providing in said one node at least one configuration management process;

b) providing said one node with a resource definition message used to configure a resource server module for each resource class needed by said one node, wherein said resource server module controls a resource of said node;

c) providing said one node with a node definition message; and d) using said configuration management process, said resource definition messages, and said node definition message to configure said one node.

25. The method of configuring nodes recited in claim 24, wherein said node definition message is derived from a node template message which defines the attributes of a node for all anticipated types of nodes in the system.

26. The method of configuring nodes recited in claim 24, wherein said resource definition messages are derived from a resource template message which defines the attributes of a resource for all node environments.

27. In a distributed data processing system comprising a plurality of interconnected nodes, each of said nodes comprising a processor and a memory coupled to said processor, a method of configuring resources for one of said nodes during run-time operation of said system, steps of said method being executed by said system as part of a computer program, said method comprising the steps of:
- a) providing in said one node a configuration management process;
- b) providing said configuration management process of said one node with a node definition message which defines a configuration for said one node;
- c) providing said configuration management process of said one node with a resource template message which represents a set of generic configuration rules;
- d) creating a resource server module in said one node;
- e) developing a resource definition message; and
- f) configuring said resource server module with said resource definition message.

28. The method of configuring resources recited in claim 27 wherein said node definition message is derived from a node template message which defines the attributes of a node for all types of nodes in the system.

* * * * *